(12) United States Patent
Dho

(10) Patent No.: US 6,793,345 B2
(45) Date of Patent: Sep. 21, 2004

(54) APPARATUS AND METHOD FOR IMAGE PROJECTION USING DICHROIC MIRROR WHEEL

(75) Inventor: Sang-whoe Dho, Suwon (KR)

(73) Assignee: Samsung Electronics Co., Ltd., Gyunggi-do (KR)

( * ) Notice: Subject to any disclaimer, the term of this patent is extended or adjusted under 35 U.S.C. 154(b) by 0 days.

(21) Appl. No.: 10/442,199

(22) Filed: May 21, 2003

(65) Prior Publication Data

US 2004/0008324 A1 Jan. 15, 2004

(30) Foreign Application Priority Data

May 21, 2002 (KR) .............................. 10-2002-0028024

(51) Int. Cl.⁷ ..................... G03B 21/26; G03B 21/14; G03B 21/00
(52) U.S. Cl. ..................... 353/94; 353/122; 353/84; 353/34
(58) Field of Search ..................... 353/94, 37, 77, 353/78, 98, 99, 30–34, 48, 49, 51, 84, 122; 349/5, 7–10; 359/889–892

(56) References Cited

U.S. PATENT DOCUMENTS 6,309,072 B1 * 10/2001 Deter .......................... 353/31
6,334,685 B1 * 1/2002 Slobodin ..................... 353/31
6,431,709 B1 * 8/2002 Tiao et al. .................... 353/34
6,457,833 B1 * 10/2002 Ishikawa et al. ............. 353/99
6,520,644 B1 * 2/2003 Lee ............................. 353/31
6,561,653 B2 * 5/2003 Belliveau .................... 353/31
2002/0109821 A1 * 8/2002 Huibers ....................... 353/84

* cited by examiner

Primary Examiner—Russell Adams
Assistant Examiner—Andrew Sever
(74) Attorney, Agent, or Firm—Sughrue Mion, PLLC

(57) ABSTRACT

An image projecting apparatus including a light source emits a plurality of monochromatic rays of light with different wavelengths. A condenser lens concentrates the plurality of monochromatic rays. A first color separating unit rotates and selectively causes the plurality of monochromatic rays to be reflected therefrom or passed therethrough. A second color separating unit selectively causes the plurality of monochromatic rays that are passed through the first color separating unit to be reflected therefrom or passed therethrough. A square beam generating unit is inputted with the plurality of monochromatic rays reflected from the first and the second color separating units and transforms the monochromatic rays as inputted into square beams. A panel unit is inputted with the square beams of the monochromatic rays and forms a plurality of monochromatic images corresponding to the monochromatic rays.

10 Claims, 5 Drawing Sheets

APPARATUS AND METHOD FOR IMAGE PROJECTION USING DICHROIC MIRROR WHEEL

BACKGROUND OF THE INVENTION

This application claims the priority of Korean Patent Application No. 2002-28024, filed May 21, 2002 in the Korean Intellectual Property Office, which is incorporated herein by reference in its entirety.

1. Field of the invention

The present invention generally relates to an image projecting apparatus using a dichroic mirror wheel, and more particularly, it relates to an image projecting apparatus capable of minimizing a light loss and improving brightness by using a pair of dichroic mirror wheels, and a method therefor.

2. Description of the Prior Art

Apparatuses like a projector or a projection system are types of displays that realize a predetermined image on a screen by projecting a light generated at a light source onto the screen through an optical system. Such displays are used in many places, namely, in meetings for presentations, in theaters and in homes.

An optical device such as a projector realizes an image by using a liquid crystal display (LCD) or a cathode ray tube (CRT). In order to accomplish a large-sized screen, conventionally, the optical device magnifies the image on the LCD and CRT, and projects the magnified image on the screen. This method merely magnifies the image, but cannot provide a clear image. In order to solve this problem, an image projecting device using a digital micromirror device (DMD) has been suggested and is presently in use.

The DMD has a number of micrormirrors corresponding to the resolution. The micromirrors control the reflection of light in accordance with the input signals. Briefly put, the DMD is a semiconductor optical switch using a micromirror. As the DMD is digital, it has excellent color representation and brightness.

FIG. 1 is a view showing a basic structure of a conventional projection type image apparatus using a color wheel.

Referring to FIG. 1, the conventional projection type image apparatus 100 using the color wheel includes a light source 110, a color wheel 120, a light tube 130, a lens 140, a DMD panel 150 and a projection lens 160. The one-dotted line in FIG. 1 represents an optic path of white light.

The light source 110 can be an arc lamp or a laser, which emits a white light. The color wheel 120 is rotated in the arrowed direction by a rotating means (not shown), and divided into a red (R), green (G) and blue (B) divisions. The white light emitted from the light source 110 is passed through the R, G and B divisions into split rays of light, i.e., R, G and B beams.

The light tube 130 is formed as a hollow hexahedron having a through hole therein. The R, G and B beams from the color wheel 120 are transformed into a square beam inside of the light tube 130. The square beam of the light is dispersed at the lens 140 to be incident on the DMD panel 150.

The DMD panel 150 includes a plurality of micromirrors 150a. The R, G and B beams of respective wavelength are reflected from the micromirrors 150a of the DMD panel 150. The reflected R, G and B beams pass through the projection lens 160 and form an image on the screen.

Such a projection type image apparatus 100 can quickly process the response signal to the split R, G and B beams by the independently-driven micromirrors 150a. In other words, color image of good quality can be obtained with a simpler structure. However, realizing an image using a color filter and single-plate type DMD panel usually utilizes only a third of the entire light quantity.

This is because 60–70% of the white light emitted from the light source is blocked at the color wheel 120. While the R beam is evenly projected on the entire panel, other beams, i.e., G and B are completely blocked by the color filter and discarded. The same situation applies with respect to the G and B beams, respectively.

Accordingly, only a third of the incident white light is utilized according to the color filter method, and the brightness of the image is deteriorated to a third. In other words, as the white light is emitted from the light source, passed through the color wheel and then projected onto the panel, the entire light quantity decreases. Accordingly, the light utilization decreases, and brightness of the realized image is also deteriorated.

SUMMARY OF THE INVENTION

Accordingly, it is an aspect of the present invention to provide an image projecting apparatus and method capable of preventing a reduction of light utilization on the single panel to a third degree, and increasing a light quantity utilization using a pair of dichroic mirror wheels.

In order to accomplish the above aspect, an image projecting apparatus consistent with the present invention includes a light source which emits a plurality of monochromatic rays of light with different wavelengths, a condenser lens which concentrates the plurality of monochromatic rays, a first color separating unit which rotates and selectively causes the plurality of monochromatic rays to be reflected therefrom or passed therethrough, a second color separating unit which selectively causes the plurality of monochromatic rays passed through the first color separating unit to be reflected therefrom or passed therethrough, a plurality of square beam generating units which are inputted with the plurality of monochromatic rays reflected from the first and the second color separating units and which transform the monochromatic rays as inputted into square beams, a plurality of panel units which are inputted with the square beams of the monochromatic rays and which form a plurality of monochromatic images corresponding to the monochromatic rays, and a plurality of projecting lens units which are disposed to face the plurality of panel units.

The first and the second color separating units each comprises a dichroic mirror wheel. Each of the plurality of panel units is inputted with the plurality of monochromatic rays, which are reflected from the first and the second color separating units by predetermined order, at least once, thereby forming an image thereon.

Each of the first and the second color separating units is divided into a plurality of divisions where the plurality of monochromatic rays are selectively reflected from or passed through. The number of the plurality of divisions is a multiple of three (3).

The first and the second color separating units are rotated at a same speed so that the plurality of monochromatic rays of different wavelengths can be reflected and passed on the same optical axis. Each of the first and the second color separating units corresponds to a basal part of a solid cone by cutting off a top by a plane parallel to the base. The plurality of panel units each comprises a digital micromirror device (DMD) for modulating the plurality of monochromatic images into a digital signal, and reflecting the signal to the plurality of projecting lens units at a predetermined angle.

According to the present invention, by employing two dichroic mirror wheels, the R, G and B monochromatic lights are selectively reflected from, or passed through the two dichroic mirror wheels according to wavelengths. As a result, independent images, or identical images can be realized on a plurality of screens even in a single panel optical device system.

An image projecting method according to another embodiment of the present invention includes emitting a plurality of monochromatic rays of light with different wavelengths through a light source, concentrating the plurality of monochromatic rays through a condenser lens, rotating and selectively causing the plurality of monochromatic rays to be reflected from or passed through a first color separating unit, selectively causing the plurality of monochromatic rays passed through the first color separating unit to be reflected from or passed through a second color separating unit, inputting a plurality of square beam generating units with the plurality of monochromatic rays reflected from the first and the second color separating units and transforming the monochromatic rays as inputted into square beams, inputting a plurality of panel units with the square beams of the monochromatic rays and forming a plurality of monochromatic images corresponding to the monochromatic rays, and disposing a plurality of projecting lens units to face the plurality of panel units.

An image projecting apparatus according to another embodiment of the present invention includes means for emitting a plurality of monochromatic rays of light with different wavelengths, means for concentrating the plurality of monochromatic rays, means for rotating and selectively causing the plurality of monochromatic rays to be reflected therefrom or passed therethrough, means for selectively causing the plurality of monochromatic rays passed through the first color separating unit to be reflected therefrom or passed therethrough, means for being inputted with the plurality of monochromatic rays reflected from the first and the second color separating units and transforming the monochromatic rays as inputted into square beams, means for being inputted with the square beams of the monochromatic rays and forming a plurality of monochromatic images corresponding to the monochromatic rays, and means for projecting being disposed to face the plurality of panel units.

An image projecting apparatus according to another embodiment of the present invention includes a light source which emits a plurality of monochromatic rays of light with different wavelengths, a condenser lens which concentrates the plurality of monochromatic rays, a first dichroic mirror wheel which rotates and selectively causes the plurality of monochromatic rays to be reflected therefrom or passed therethrough, a second dichroic mirror wheel which selectively causes the plurality of monochromatic rays passed through the first color separating unit to be reflected therefrom or passed therethrough, a plurality of square beam generating units which are inputted with the plurality of monochromatic rays reflected from the first and the second dichroic mirror wheels and which transform the monochromatic rays as inputted into square beams, a plurality of digital micromirror devices DMD's which are inputted with the square beams of the monochromatic rays and form a plurality of monochromatic images corresponding to the monochromatic rays and a plurality of projecting lens units disposed to face the plurality of DMD's.

BRIEF DESCRIPTION OF THE DRAWINGS

The above objects and other features of the present invention will become more apparent by describing in detail an exemplary embodiment thereof with reference to the attached drawings, in which.

DETAILED DESCRIPTION OF AN EXEMPLARY EMBODIMENT

Hereinafter, the present invention will be described in detail with reference to the accompanying drawings.

Figure 1:
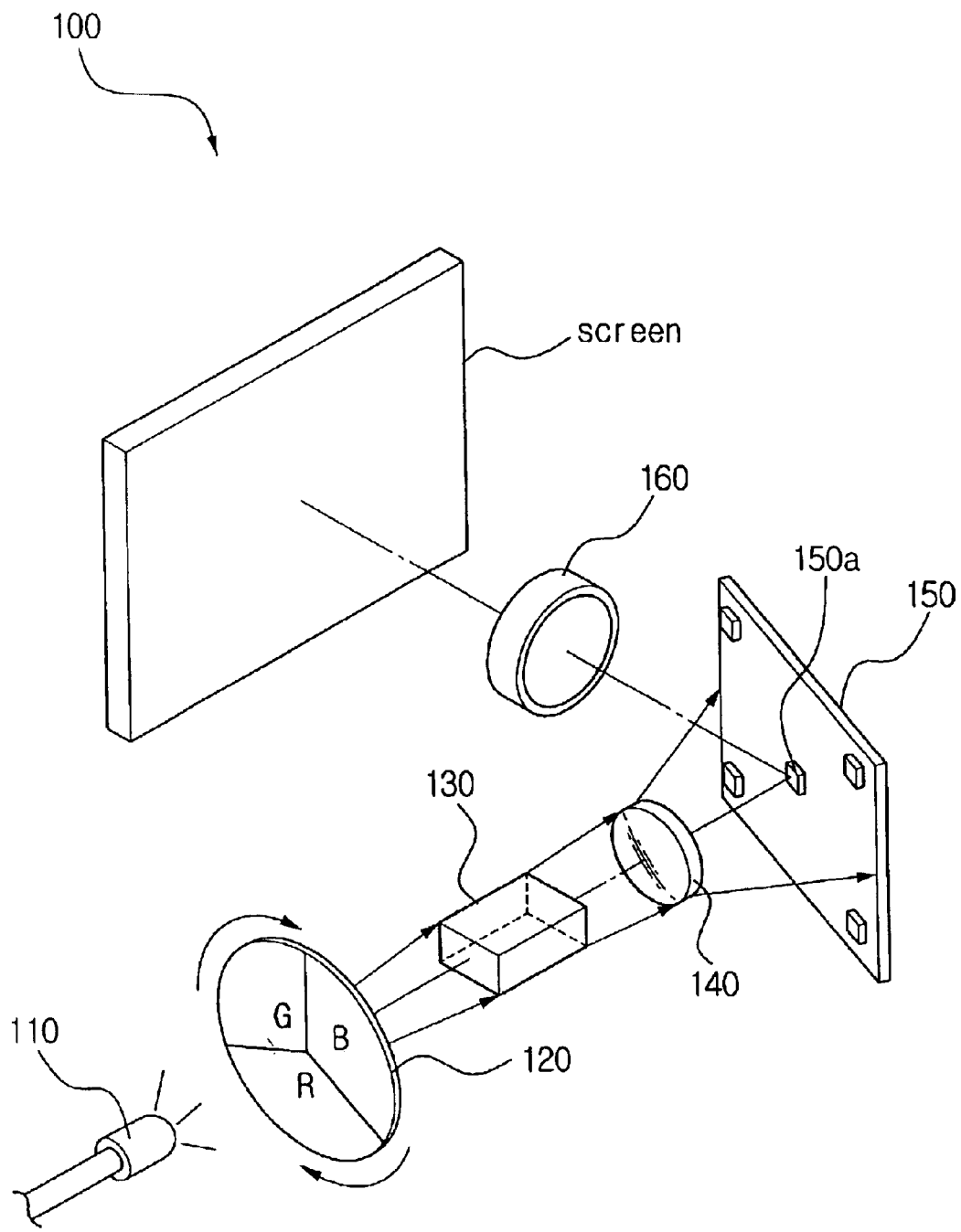
FIG. 1 is a view showing a basic structure of a conventional projection type image apparatus using a color wheel.
Figure 2:
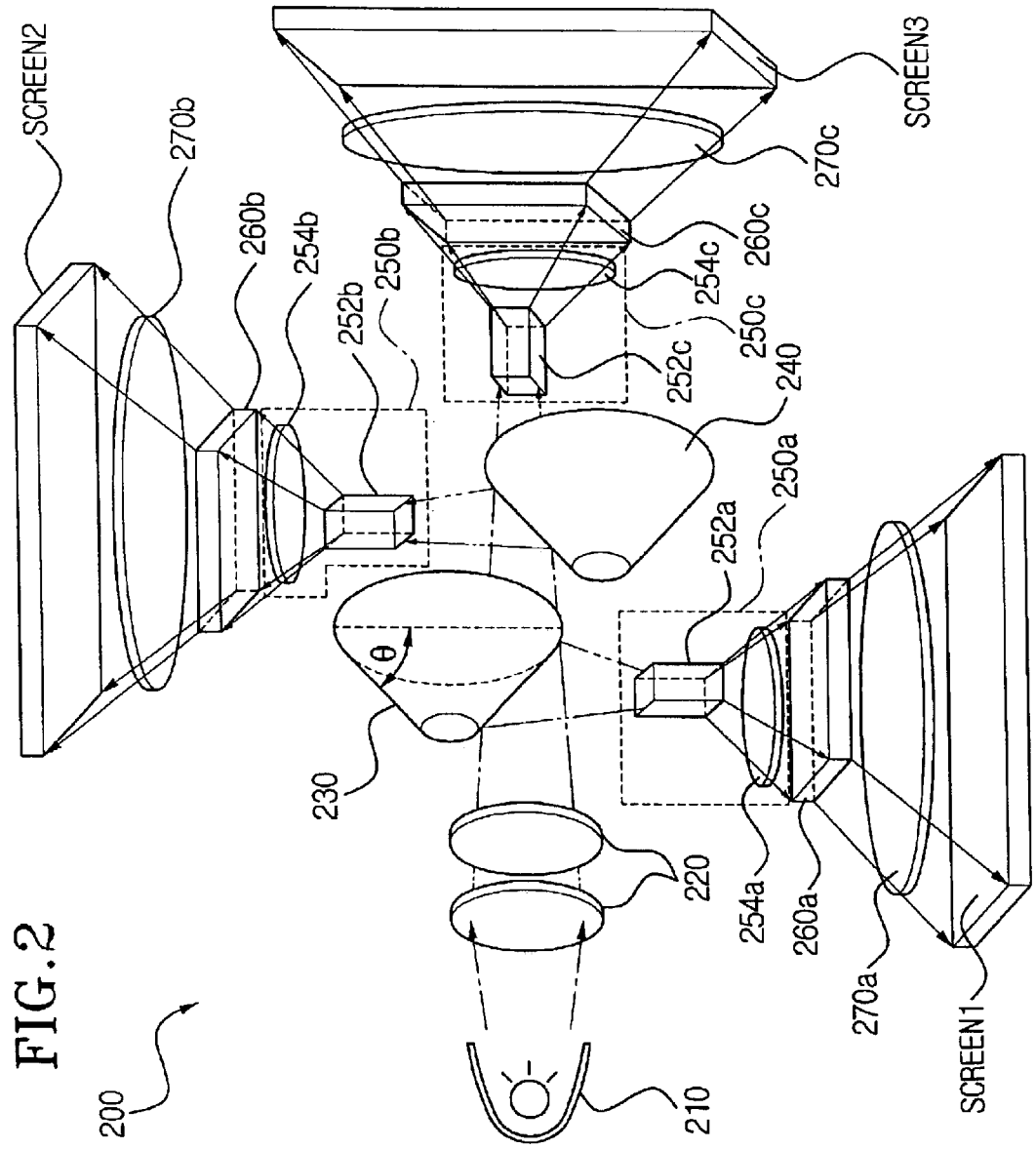
FIG. 2 is a view showing a basic structure of an image projecting apparatus according to an exemplary embodiment of the present invention.

FIG. 2 is a view showing the basic structure of an image projecting apparatus according to an illustrative, non-limiting embodiment of the present invention.

Referring to FIG. 2, the image projecting apparatus 200 according to the present invention includes a light source 210, a condenser lens 220, a first dichroic mirror wheel 230 as a first color separating unit, a second dichroic mirror wheel 240 as a second color separating unit, first, second and third square beam generating units 250a, 250b, 250c, first, second and third panel units 260a, 260b, 260c, and first, second and third projection lenses 270a, 270b, 270c.

In FIG. 2, a path of travel of the light passing through the first and the second dichroic mirror wheels 230, 240 is represented by a one-dotted line, while a path of travel of the light reflected from the first and the second dichroic mirror wheels 230, 240 is represented by a two-dotted line.

The light source 210 emits white light. The white light consists of a plurality of monochromatic lights of different wavelengths. The plurality of monochromatic lights include red (R), green (G), and blue (B) lights. The light source 210 may be formed as a laser, an arc lamp, a metal halide lamp, a halogen lamp or a xenon lamp.

The condenser lens 220 concentrates the R, G and B lights that are emitted from the light source 210. Preferably, the condenser lens 220 includes a pair of collimating lenses. The lights emitted from the condenser lens 220 is concentrated on the first dichroic mirror wheel 230.

As generally known, the dichroic mirror splits the white light from the light source into R, G and B lights in accordance with the respective wavelengths. Such a dichroic mirror is glass surface coated with a dielectric multi-layer, and selectively causes the light to be reflected therefrom or passed therethrough using light interference. In other words, the light is either reflected from, or passed through the dichroic mirror in accordance with the property of coating.

Figure 3:
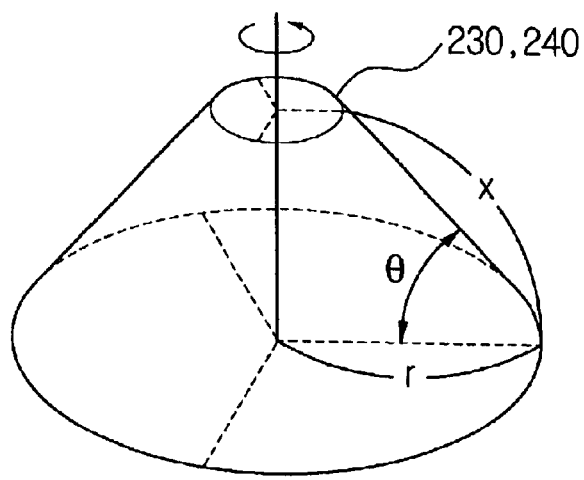
FIG. 3 is a view showing a basic structure of a first dichroic mirror wheel and a second dichroic mirror wheel of FIG. 2.
Figure 4A:
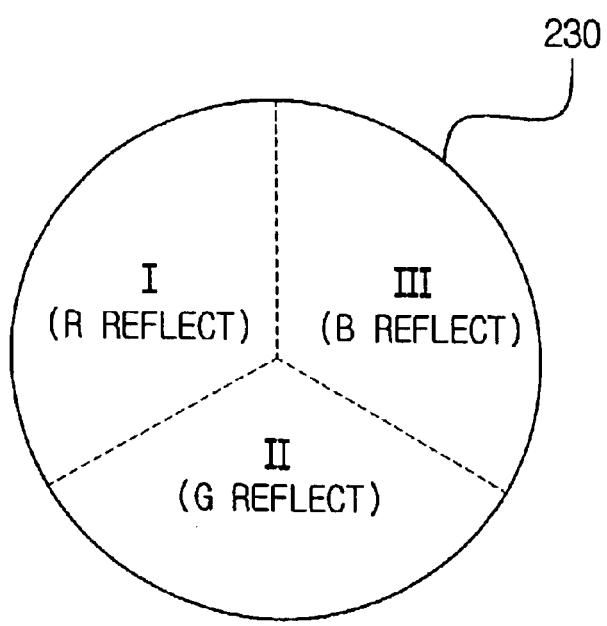
FIGS. 4A and 4B are transverse sectional views of the first and the second dichroic mirror wheels of FIG. 2.
Figure 4B:
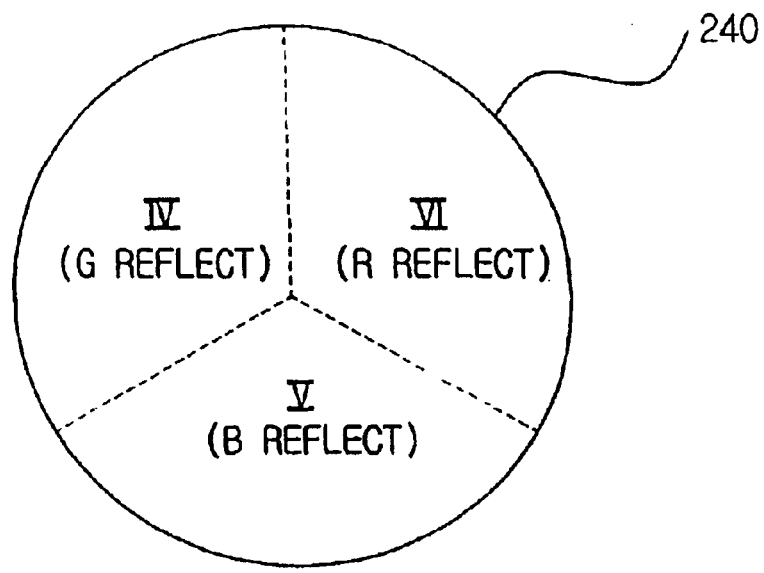
Figure 5:
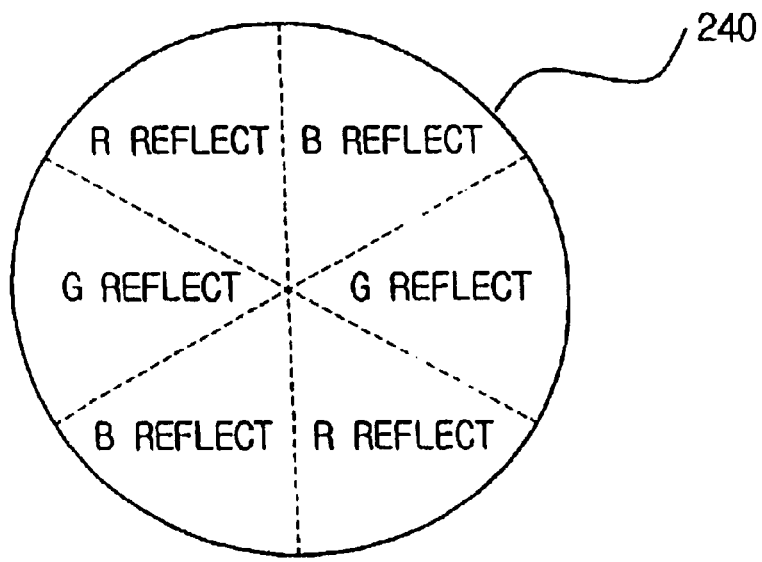
FIG. 5 is another transverse sectional view of a dichroic mirror wheel of FIG. 2.
Figure 6:
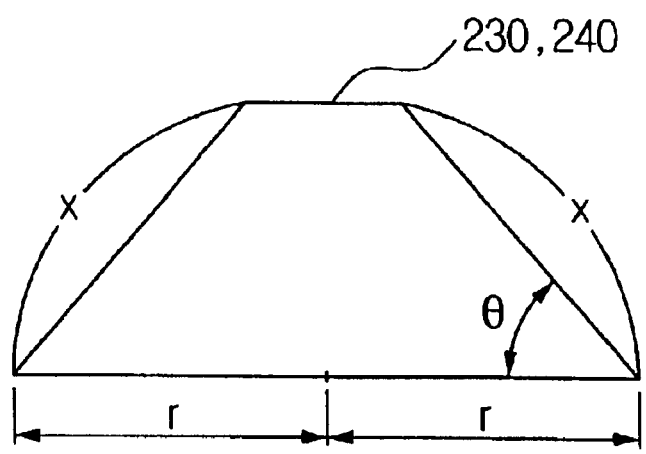
FIG. 6 is a longitudinal sectional view of the first and the second dichroic mirror wheels of FIG. 3.

FIG. 3 is a view showing the basic structure of the first and the second dichroic mirror wheels 230, 240 of FIG. 2, and FIGS. 4A and 4B are transverse sectional views showing the first and the second dichroic mirror wheels 230, 240 of FIG. 2. FIG. 5 is another transverse sectional view of the dichroic mirror wheel 240 of FIG. 2, and FIG. 6 is a longitudinal sectional view of the first and the second dichroic mirror wheels 230, 240 of FIG. 3.

Referring to FIG. 3, each of the first and the second dichroic mirror wheels 230, 240 is formed as a frustum-cone, i.e., the basal part of a solid cone by cutting off the top by a plane parallel to the base. The first and the second dichroic mirror wheels 230, 240 are rotated in the arrowed direction or in a direction opposite to the arrowed direction.

The first and the second dichroic mirror wheels 230, 240 may be rotated in the same direction, or oppositely, and with the same rotational speed. The first and the second dichroic mirror wheels 230, 240 are rotated at the same speed so as to cause the R, G and B lights to be reflected therefrom or passed therethrough on the same light axis.

The first and the second dichroic mirror wheels 230, 240 may be driven by the motors (not shown) respectively provided therefor, or by a single motor (not shown) commonly provided therefor.

Referring to FIGS. 4A and 4B, each of the first and the second dichroic mirror wheels 230, 240 is divided into three divisions for causing the R, G and B beams to be reflected therefrom or passed therethrough. The divisions are coated respectively according to the property of the R, G and B beams, to selectively cause the R, G and B lights to be reflected therefrom or passed therethrough.

More specifically, by coating the respective divisions with different thickness, the first and the second dichroic mirror wheels 230, 240 can selectively cause the R, G and B lights to be reflected therefrom or passed therethrough. For example, FIG. 4A shows the I-division being coated to exclusively reflect the R light, II-division being coated to exclusively reflect the G light, and III-division being coated to exclusively reflect the B light.

The number of divisions of the dichroic mirror wheel corresponds to the multiples of 3, such as 6, 9 and so on. The dichroic mirror wheel having a greater number of divisions is rotated at a slower speed.

For example, the dichroic mirror wheel divided into 6 divisions as shown in FIG. 5 is rotated at a half speed of the first and the second dichroic mirror wheels 230, 240 respectively having 3 divisions divided therein. In rotation, the dichroic mirror wheel having 6 divisions realizes 60 frames of images per second.

Referring to FIG. 6, assuming that the radius of the base of each of the first and the second dichroic mirror wheels 230, 240 is r, and the maximum height from the base to the top is x, the radius r and the maximum height x is at an angle θ. In accordance with the angle θ, the direction of reflection and penetration of the light with respect to the respective divisions of the first and the second dichroic mirror wheels 230, 240 is determined.

In rotation, the first dichroic mirror wheel 230 selectively causes the R, G and B lights, concentrated by the condenser lens 220, to be reflected therefrom or passed therethrough. In other words, while the first dichroic mirror wheel 230 is rotated, each division of the first dichroic mirror wheel 230 reflects the arriving light that corresponds to the property of the material coated thereon, while permitting the rest of the lights to pass therethrough.

The second dichroic mirror wheel 240 reflects one of the lights passed through the first dichroic mirror wheel 230, while permitting the other light to pass therethrough. In other words, while the second dichroic mirror wheel 240 is rotated, each division of the second dichroic mirror wheel 240 reflects the arriving light that corresponds to the property of the material coated thereon, while permitting the other light to pass therethrough.

The reflected light from the first dichroic mirror wheel 230 is incident on the first square beam generating unit 250a, while the reflected light from the second dichroic mirror wheel 240 is incident on the second square beam generating unit 250b. The light passed through the second dichroic mirror wheel 240 is incident on the third square beam generating unit 250c.

The first, the second and the third square beam generating units 250a, 250b, 250c transform the lights incident thereon into square beams. The first, the second and the third square beam generating units 250a, 250b, 250c include first, second and third light tubes 252a, 252b, 252c and first, second and third relay lenses 254a, 254b, 254c, respectively.

The R, G and B beans incident on the hollow interior of the first, the second and the third light tubes 252a, 252b, 252c from the first and the second dichroic mirror wheels 230, 240 are transformed to the square beam. Each of the first, the second and the third light tubes 252a, 252b, 252c are formed as a hollow hexahedron having a through hole therein. The interior of each of the first, the second and the third light tubes 252a, 252b, 252c is defined by four mirrors.

The first, the second and the third relay lenses 254a, 254b, 254c disperse the square beam of the R, G and B lights to be incident on the first, the second and the third panel units 260a, 260b, 260c corresponding to the respective relay lenses 254a, 254b, 254c. The first, the second and the third panel units 260a, 260b, 260c form monochromatic images thereon with the R, G and B lights transformed into the square beam and incident thereon.

A color image is formed by the combination of the R, G and B lights, as the R, G and B lights are incident on the first, the second and the third panel units 260a, 260b, 260c by predetermined order at least once. Since the image signals of the lights incident on the first, the second and the third panel units 260a, 260b, 260c are different, images realized on the screen 1, screen 2 and screen 3 also vary.

The first, the second and the third panel units 260a, 260b, 260c respectively include a digital micromirror device (DMD) panel, or a liquid crystal display (LCD) panel. While the DMD panel is a reflective panel, the LCD panel is a transit panel. For using the LCD panel, the position of the projection lens and the screens can be varied. Now, the operation of the present invention will be described with reference to one example using the DMD panel.

The movable mirrors respectively provided at the first, the second and the third panel units 260a, 260b, 260c modulate the R, G and B monochromatic images on the first, the second and the third panel units 260a, 260b, 260c, subject the monochromatic images to the time-division process and then reflect at a predetermined angle.

The entire image reflected from the movable mirrors of the first, the second and the third panel units 260a, 260b, 260c is projected onto a plurality of screens screen1, screen2, screen3, forming an image thereon. The first, the second and the third projection lenses 270a, 270b, 270c are disposed opposite to the respective DMD panels 260a, 260b, 260c.

The plurality of screens screen1, screen2, screen3 may have the same, or different size. Further, when different image signals are inputted on the DMD panels 260a, 260b, 260c, images are differently formed on the respective screens screen1, screen2, screen3. Since images formed on the respective screens screen1, screen2, screen3 vary in accordance with the respective image signals inputted to the DMD panels 260a, 260b, 260c, different images can be formed on the respective screens screen1, screen2, screen3.

Hereinbelow, forming different color images on a plurality of panels 260a, 260b, 260c according to an exemplary embodiment will be described with reference to table 1.

TABLE 1

| | I-division | II-division | III-division |
|---|---|---|---|
| First Dichroic mirror wheel | R: reflect<br>G,B: pass<br>↓<br>IV-division | G: reflect<br>R,B: pass<br>↓<br>V-division | B: reflect<br>R,G: pass<br>↓<br>VI-division |
| Second Dichroic mirror wheel | G: reflect<br>B: pass | B: reflect<br>R: pass | R: reflect<br>G: pass |

Referring to FIGS. 4A and 4B, and table 1, the divisions I through VI of the first and the second dichroic mirror wheels 230, 240 are coated to a different thickness so as to selectively cause the light to be reflected therefrom or passed therethrough. More specifically, I and VI divisions are coated to cause the R light to be reflected therefrom, II and IV divisions are coated to cause the G light to be reflected therefrom, and III and V divisions are coated to cause the B light to be reflected therefrom.

The first and the second dichroic mirror wheels 230, 240 may be rotated in the same direction or opposite directions. It should be assured that I and IV divisions, II and V divisions, and III and VI divisions are faced with each other at least once in every rotation, and for this purpose, the first and the second dichroic mirror wheels 230, 240 are rotated at the same speed.

By doing as above, a light passed through the first dichroic mirror wheel 230 can be reflected from the second dichroic mirror wheel 240 while the other light passed through the first dichroic mirror wheel 230 is passed through the second dichroic mirror wheel 240. In other words, if a certain area a of one division which reflects a certain light is made to face another area a' of the second dichroic mirror wheel 240 that also reflects the certain light, all the lights are passed through another area a' of the second dichroic mirror wheel 240 without a reflection of light.

The above situation is prevented by rotating the first and the second dichroic mirror wheels 230, 240 because the R, G and B monochromatic lights of different wavelengths are reflected and passed on the same optical axis.

For example, it is the IV division of the second dichroic mirror wheel 240 that can selectively cause the G and B lights from the I division of the first dichroic mirror wheel 230 to be reflected or passed. Accordingly, the I and IV divisions need to face each other at least once.

The method of forming one color image on the panels will be described with reference to table 1.

(a) As the white light inclusive of R, G and B lights is emitted from the light source 210 and reaches the I division of the first dichroic mirror wheel 230 in rotation, R light is reflected from the I division, while the G and B lights are passed through the I division. The G and B lights are passed through the I division, and reach the IV division of the second dichroic mirror wheel 240 in rotation. In the IV division, G light is reflected and the B light is passed.

(b) As the white light reaches the II division of the first dichroic mirror wheel 230 in rotation, G light is reflected while the R and B lights are passed. The R and B lights are passed through the II division, and reach the V division of the second dichroic mirror wheel 240 in rotation. In V division, B light is reflected and R light is passed.

(c) As the white light reaches the III division of the first dichroic mirror wheel 230 in rotation, B light is reflected while the R and G lights are passed. The R and G lights are passed through the III division, and reach the VI division of the second dichroic mirror wheel 240 in rotation. In VI division, R light is reflected and G light is passed.

Referring to the process (a), R light, which is reflected from the I division, is incident on the first square beam generating unit 250a, forming a monochromatic image thereon. G light, which is reflected from the IV division, is incident on the second square beam generating unit 250b, and B light, which is passed through the IV division, is incident on the third square beam generating unit 250c, respectively forming corresponding monochromatic images.

Referring to the process (b), G light, which is reflected from the II division, is incident on the first square generating unit 250a. B light, which is reflected from the V division, is incident on the second square beam generating unit 250b, and R light, which is passed through the V division, is incident on the third square beam generating unit 250, respectively forming corresponding monochromatic images.

Referring to the process (c), B light, which is reflected from the III division, is incident on the first square generating unit 250a, R light, which is reflected from the VI division, is incident on the second square beam generating unit 250b, and G light, which is passed through the VI division, is incident on the third square beam generating unit 250c, respectively forming corresponding monochromatic images.

By the processes (a), (b), (c), a plurality of lights are successively incident on the first square beam generating unit 250a and the first panel unit 260 by order of R light→G light→B light and by order of G light→B light→R light on the second square beam generating unit 250b and the second panel unit 260, and by order of B light→R light→G light on the third square beam generating unit 250c and the third panel unit 260c.

After being transformed into square beams at the first, the second and the third square beam generating units 250a, 250b, 250c, the square lights are projected onto the first, the second and the third panel units 260a, 260b, 260c by order described above. As a result, one color image is realized on the respective panel units 260a, 260b, 260c.

For example, one color image is realized as I) R monochromatic image with respect to R light, ii) G monochromatic image with respect to G light, and iii) B monochromatic image with respect to B light, are consecutively formed on the first panel unit 260a. The monochromatic images are formed on the other panel units 260b, 260c by order of incident of the lights on the second and the third square beam generating units 250b, 250c. As the lights from three different monochromatic images, one color image is formed.

Considering another exemplary embodiment of the present invention, the respective divisions of the first and the second dichroic mirror wheels 230, 240 may be coated with the following properties in the table 2.

TABLE 2

| | I-division | II-division | III-division |
|---|---|---|---|
| First Dichroic mirror wheel | R: reflect<br>G,B: pass<br>↓<br>IV-division | G: reflect<br>R,B: pass<br>↓<br>V-division | B: reflect<br>R,G: pass<br>↓<br>VI-division |
| Second Dichroic mirror wheel | B: reflect<br>G: pass | R: reflect<br>B: pass | G: reflect<br>R: pass |

Referring to table 2, R light is reflected from the I-division, while G and B lights are passed therethrough. Then B light is reflected from the IV-division, and the G light is passed therethrough. Further, G light is reflected from the II-division, while R and B lights are passed therethrough. Then R light is reflected from the V-division, and B light is passed therethrough. Further, B light reflected from the III-division, while G and R lights are passed therethrough. Then G light is reflected from the VI-division, and R light is passed therethrough.

Alternatively, a complex type image projecting system that employs a projector instead of one screen can be used. In this case, an operator can use the projector for presentations or the like, while having different images formed on two screens. Accordingly, the image projecting device can be used more efficiently.

As described above, the apparatus and method for image projecting device according to the present invention includes two rotatable dichroic mirror wheels that selectively cause a plurality of monochromatic lights in white light to be reflected therefrom or passed therethrough according to the wavelength properties. As a result, compared to the conventional system that uses a single panel and thus has a deterioration of light utilization by a third, the present invention has a reduced amount of discarded, or absorbed monochromatic light, and increased light utilization. Further, independent or identical images can be formed on a plurality of screens by using the lights being reflected from, or passed through the respective dichroic mirrors.

Although a few exemplary embodiments of the present invention have been described, it will be understood by those skilled in the art that the present invention should not be limited to the described exemplary embodiments, but various changes and modifications can be made within the spirit and scope of the present invention as defined by the appended claims.

What is claimed is:

1. An image projecting apparatus, comprising:
   a light source which emits a plurality of monochromatic rays of light with different wavelengths;
   a condenser lens which concentrates the plurality of monochromatic rays;
   a first color separating unit which rotates and selectively causes the plurality of monochromatic rays to be reflected therefrom or passed therethrough;
   a second color separating unit which selectively causes the plurality of monochromatic rays passed through the first color separating unit to be reflected therefrom or passed therethrough;
   a plurality of square beam generating units which are inputted with the plurality of monochromatic rays reflected from the first and the second color separating units and which transform the monochromatic rays as inputted into square beams;
   a plurality of panel units which are inputted with the square beams of the monochromatic rays and which form a plurality of monochromatic images corresponding to the monochromatic rays; and
   a plurality of projecting lens units which are disposed to face the plurality of panel units.

2. The image projecting apparatus of claim 1, wherein each of the first and the second color separating units comprises a dichroic mirror wheel.

3. The image projecting apparatus of claim 1, wherein each of the plurality of panel units is inputted with the plurality of monochromatic rays, which are reflected from the first and the second color separating units by predetermined order, at least once, thereby forming an image thereon.

4. The image projecting apparatus of claim 1, wherein each of the first and the second color separating units is divided into a plurality of divisions where the plurality of monochromatic rays are selectively reflected from or passed through.

5. The image projecting apparatus of claim 4, wherein the number of the plurality of divisions is a multiple of three (3).

6. The image projecting apparatus of claim 4, wherein the first and the second color separating units are rotated at a same speed so that the plurality of monochromatic rays of different wavelengths can be reflected and passed on the same optical axis.

7. The image projecting apparatus of claim 1, wherein each of the first and the second color separating units corresponds to a basal part of a solid cone by cutting off a top by a plane parallel to the base.

8. The image projecting apparatus of claim 1, wherein each of the plurality of panel units comprises a digital micromirror device (DMD) for modulating the plurality of monochromatic images into a digital signal, and reflecting the signal to the plurality of projecting lens units at a predetermined angle.

9. An image projecting method, comprising:

emitting a plurality of monochromatic rays of light with different wavelengths through a light source;

concentrating the plurality of monochromatic rays through a condenser lens;

rotating and selectively causing the plurality of monochromatic rays to be reflected from or passed through a first color separating unit;

selectively causing the plurality of monochromatic rays passed through the first color separating unit to be reflected from or passed through a second color separating unit;

inputting a plurality of square beam generating units with the plurality of monochromatic rays reflected from the first and the second color separating units and transforming the monochromatic rays as inputted into square beams;

inputting a plurality of panel units with the square beams of the monochromatic rays and forming a plurality of monochromatic images corresponding to the monochromatic rays; and disposing a plurality of projecting lens units to face the plurality of panel units.

10. An image projecting apparatus, comprising:

means for emitting a plurality of monochromatic rays of light with different wavelengths;

means for concentrating the plurality of monochromatic rays;

means for rotating and selectively causing the plurality of monochromatic rays to be reflected therefrom or passed therethrough;

means for selectively causing the plurality of monochromatic rays passed through the first color separating unit to be reflected therefrom or passed therethrough;

means for being inputted with the plurality of monochromatic rays reflected from the first and the second color separating units and transforming the monochromatic rays as inputted into square beams;

means for being inputted with the square beams of the monochromatic rays and forming a plurality of monochromatic images corresponding to the monochromatic rays; and means for projecting being disposed to face the plurality of panel units.

* * * * *